June 21, 1949.          G. B. STILLWAGON, JR          2,473,618
                            UNIVERSAL JOINT
                          Filed Jan. 5, 1944
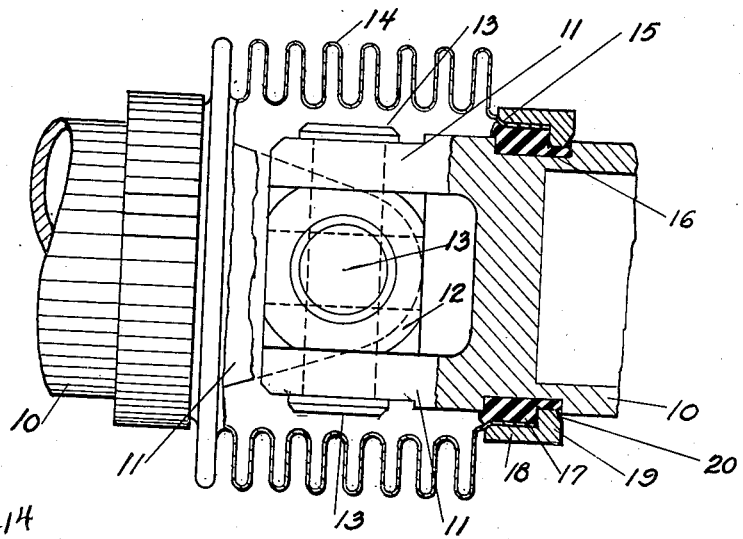
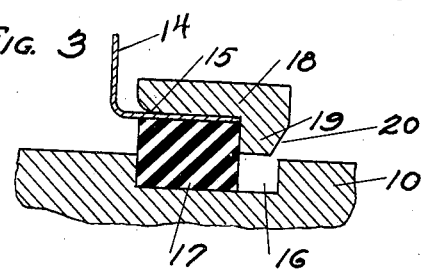
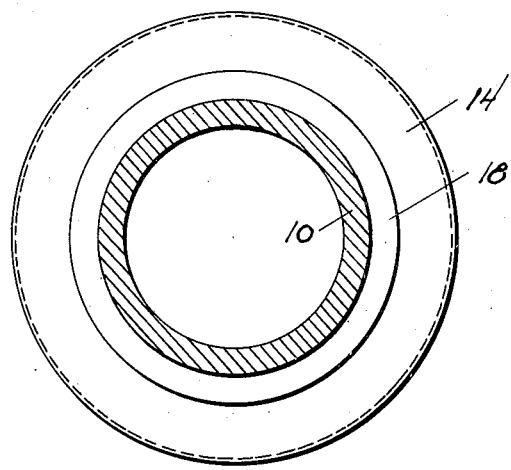
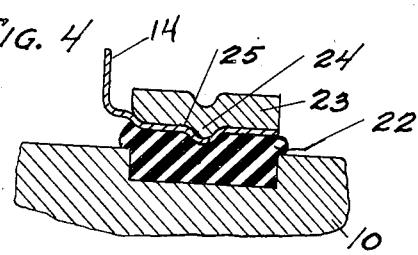
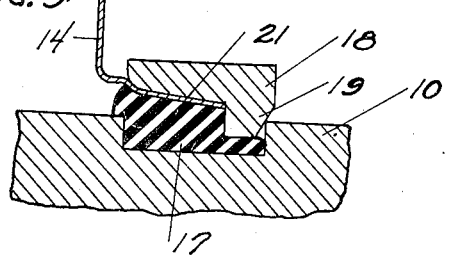
INVENTOR
GEORGE B. STILLWAGON, JR.
By
ATTORNEY Patented June 21, 1949

2,473,618

UNITED STATES PATENT OFFICE 2,473,618

UNIVERSAL JOINT

George B. Stillwagon, Jr., Dayton, Ohio, assignor of one-half to Kenneth G. Fraser, Dayton, Ohio Application January 5, 1944, Serial No. 517,019

8 Claims. (Cl. 64—32)

This invention relates to universal joints and more particularly to a lubricant retaining cover for such a joint and the means for attaching the same to the joint.

Universal joints equipped with lubricant containing covers of synthetic rubber or the like, of the type shown in Patent No. 2,264,728, granted December 2, 1941 to Stillwagon and Fraser, are in extensive use, particularly on military aircraft, and are not adversely affected by ordinary variations in temperature. However, when subjected to extremely low temperatures, such as exist in the stratosphere and the polar regions, synthetic rubber stiffens and becomes more or less brittle and it is one object of the invention to provide a cover for a universal joint which will not be adversely affected by such extremely low temperatures or by high temperatures, such as those to which the cover might be subjected if the joint was installed close to an engine or other source of heat.

A cover of metal or other non-elastic material cannot be attached to the joint in the manner in which an elastic cover is so attached and a further object of the invention is to provide means for attaching a non-elastic cover to the joint in tightly sealed relation thereto.

A further object of the invention is to provide such an attaching device which is simple in construction and application and is highly efficient in operation, and which can be applied to the cover after the latter has been filled with lubricant.

Other objects of the invention may appear as the invention is described in detail.

In the accompanying drawings Fig. 1 is an elevational view, partly in section, of a universal joint equipped with the present invention; Fig. 2 is an end view of the cover, with one of the coupling members in section; Fig. 3 is a detail sectional view of the attaching device in its initial or uncompressed condition, on a slightly larger scale; Fig. 4 is a sectional detail view of a slightly modified form of attaching device; and Fig. 5 is a sectional detail view of another modification of the attaching device.

In these drawings I have illustrated one embodiment of the invention and have shown the same as applied to a universal joint of a well known type, and have also shown certain modifications of the attaching device, but it is to be understood that both the cover and the attaching device may take various forms and may be applied to universal joints or the like of various kinds without departing from the spirit of the invention.

As shown in Fig. 1 the universal joint comprises two cylindrical coupling members 10 arranged end to end and each provided with a pair of laterally spaced jaws 11, the jaws of each pair being in planes intersecting the planes of the jaws of the other pair. A bearing block 12 is interposed between the jaws of both pairs and is pivotally connected with the respective jaws, as by pivot pins 13, so that the two coupling members may have relative pivotal movement about intersecting axes.

The cover 14 comprises a tubular structure, preferably of sheet metal, adapted to extend about the jaws 11 and to be anchored at its ends to the coupling members. The body of the cover is so formed that diametrically opposite portions thereof will be, respectively, expanded and contracted as the coupling members rotate about intersecting longitudinal axes. In the present construction the body of the cover is provided with relatively deep circumferential corrugations and constitutes in effect a bellows. The bellows is provided at each end with an outwardly extending annular portion or flange 15 which extends about the cylindrical portion or barrel of the corresponding coupling member. In applying the cover to the joint at least one end thereof must be moved over the ends of the pivot pins, which project slightly beyond the surface of the barrel, and inasmuch as the flanges cannot be radially extended they are made of an internal diameter greater than the diameter of the barrel. The intermediate or corrugated portion of the cover is of an internal diameter sufficiently greater than the diameter of the barrels to prevent the pivot pins or jaws from contacting the cover when the joint rotates with the coupling members in their positions of greatest angularity.

The ends of the cover must be firmly anchored to the respective coupling members to prevent axial displacement thereof by the pull or push of the cover as it flexes during the rotation of the joint, and the connections must be tightly sealed to prevent the escape of lubricant. Further, the means for anchoring and sealing the ends of the cover to the coupling members must be of such a character that at least one end of the cover may be anchored and sealed after the cover has been filled with lubricant. For the purpose of so anchoring and sealing the ends of the cover a band 17 of yieldable sealing material is placed about the coupling member at each end of the cover and is secured thereto.

This yieldable band, or sealing member, is of an initial outside diameter approximating the internal diameter of the flange of the cover, so that the latter may be slipped over the sealing member. An annular attaching member 18 is then placed about the flange and radially compressed to a smaller diameter, and the flange being confined between the attaching member and the sealing member is likewise compressed to a smaller diameter, without material distortion thereof, and the sealing member is thereby compressed, thus anchoring and sealing the flange.

In the preferred construction each coupling member is provided with a circumferential groove 16 to receive the sealing member 17, which is shown as a band of synthetic rubber having the desired degree of softness. The internal diameter of the sealing member is such that it must be stretched to enable it to be moved over the coupling member to the groove and that it will then contract into contact with the base or wall of the groove. The initial thickness of the sealing member is such that when seated in the groove it will have an outside diameter approximating the internal diameter of the flange 15. The sealing member is preferably seated in the groove before the cover is placed about the joint but the bellows shaped cover may be longitudinally contracted to permit the sealing member to be inserted in the groove after the cover has been placed about the joint. The attaching member 18 is preferably in the form of an annular band of metal of an interior diameter such that it may be slipped over the flange 15 and is of such thickness that it may be compressed, by a collet or otherwise, to a smaller diameter, without buckling or other distortion. The compression of the attaching member and the flange presses the sealing member into tight sealing contact with the base and inner wall of the groove and compresses the same to a reduced thickness, the resulting distortion of the sealing member usually causing a portion thereof to extend across the inner wall of the groove and thus increase the sealing action thereof. In order to positively lock the attaching member against axial displacement it may be provided at its outer end with an internal flange 19 adapted to enter the groove when the attaching member is compressed, the groove being of a width slightly greater than the width of the sealing member to permit the entrance of the flange 19. By beveling the outer corner of the flange, as shown at 20, it is caused to engage the outer side wall of the groove and press the sealing member against the inner wall of the groove. If desired, the inner surface of the attaching member may be sloped outwardly toward the axis of the coupling member so as to impart thereto a frusto-conical shape, as shown at 21 in Fig. 5. When so shaped the compression of the attaching member will impart a corresponding slope to the flange 15 and the inward pressure exerted on the attaching member by the outer wall of the groove will cause it to engage the flange 15 with a wedging action and to very tightly grip the same.

It is not essential that the attaching member should have a part extending into the groove but when that part is omitted I prefer to provide the attaching member and flange 15 with interlocking parts to more positively prevent the relative axial movement thereof. In Fig. 4 there is shown an arrangement in which the sealing member 22 completely fills the groove and the attaching member 23 is provided between its ends with an internal bead 24 which, when the attaching member is compressed, presses a portion of the flange 25 into the sealing member, thus interlocking the three parts one with the other. The bead on the attaching member may be formed thereon prior to or during the compressing operation.

It will be apparent from the foregoing that I have provided a lubricant containing cover for a universal joint which is not affected by extreme ranges in temperature and which can be readily slipped over the assembled joint, and an attaching device whereby an annular end portion of the cover, of greater diameter than the barrels of the joint, can be firmly anchored to the joint and tightly sealed against the escape of lubricant. A universal joint of the jaw type is not a constant velocity joint but the two coupling members have some relative rotative movement during the operation of the joint. The cover tends to rotate at constant velocity and the sealing members will yield circumferentially sufficiently to compensate for that relative movement of the coupling members and thus avoid the torsional strain to which the cover would be subjected if the connections between the same and the joint were absolutely rigid. Further, the ends of the cover being positively anchored against axial displacement it is possible to make the cover initially of a length slightly less or slightly greater than the distance between the points at which it is to be attached to the coupling members. When the cover is to be attached to the joint it is stretched or compressed to bring the flanges at the ends thereof to proper attaching positions and is thus placed under tension or compression, so that when it has been anchored to the joint the tension or compression thereof will hold the pivot pins in firm contact with their bearings and prevent relative movement or rattling thereof due to vibration and resulting wear on the joint.

While I have shown and described one embodiment of my invention, together with certain minor modifications thereof, I wish it to be understood that I do not desire to be limited to the details thereof as various modifications may occur to a person skilled in the art.

Having now fully described my invention, what I claim as new and desire to secure by Letters Patent, is:

1. A cover for a universal joint of the type comprising coupling members pivotally connected one with the other for movement about intersecting axes, said cover including a tubular structure of resilient metal extending about the pivotal connections between said coupling members, sealing members of yieldable material mounted about and in sealing contact with the respective coupling members and held against axial movement with relation thereto, said cover having end portions overlying said sealing members and having sealing contact therewith, and annular attaching members extending about the respective end portions of said cover in tight engagement therewith, holding said end portions in firm engagement with said sealing members and retaining said sealing members in sealing contact with said coupling members.

2. A cover for a universal joint of the type comprising coupling members pivotally connected one with the other for movement about intersecting axes and each having a circumferential groove, a sealing member of yieldable material in each groove, an extensible tubular structure of resilient material extending about said pivotal connections and having annular flanges at the ends thereof extending about and in contact with the respective sealing members, and annular attaching members extending about said flanges in sealing contact therewith and retaining said flanges in firm contact with said sealing members and maintaining said sealing members in tight engagement with the walls of said grooves.

3. A cover for a universal joint of the type comprising coupling members pivotally connected one to the other for movement about intersecting axes, a metallic bellows extending about and spaced from the pivotal connections between said coupling members and having annular portions projecting axially beyond the respective ends thereof and extending about said coupling members, annular sealing members of yieldable material interposed between said end portions of said bellows and said coupling members and held against axial movement with relation to the latter, and annular attaching members extending about said end portions of said bellows, tightly gripping the same between said attaching devices and said sealing members and maintaining said sealing members in firm sealing contact with said coupling members.

4. A cover for a universal joint of the type comprising coupling members pivotally connected one to the other for movement about intersecting axes and each having a circumferential groove, annular sealing members of yieldable material seated in said grooves and projecting radially beyond the surfaces of said coupling members, a metallic bellows extending about and spaced from the pivotal connections between said coupling members and having annular portions projecting from the ends thereof about the respective sealing members, and annular members extending about said end portions of said bellows, holding the latter in firm contact with said sealing members and holding said sealing members in firm engagement with the walls of said grooves.

5. In a cover for a universal joint of the type comprising coupling members pivotally connected one to the other for movement about intersecting axes and each having a circumferential groove, a yieldable sealing member in each groove, a tubular structure of resilient metal extending about said pivotal connections and having annular flanges at the ends thereof extending about the respective sealing members, and annular attaching members extending about said flanges, holding the latter in firm contact with said sealing members and maintaining said sealing members in tight engagement with the walls of said grooves, said attaching members having parts extending into said grooves to lock the same in engagement with the respective flanges.

6. A cover for a universal joint of the type comprising a coupling member having an exterior circumferential groove, said cover including a flexible tubular member having at one end thereof an annular body of yieldable material extending into said groove, and an annular metallic attaching member of a width approximating the width of said groove mounted about said body of yieldable material and having an internal diameter less than the initial external diameter of said body of yieldable material, whereby said body of yieldable material is retained in said groove in tight sealing engagement with said coupling member.

7. A cover for a universal joint of the type comprising a coupling member having an exterior circumferential groove, said cover including a flexible tubular member having at one end thereof an annular body of yieldable material extending into said groove, and an annular metallic attaching member of a width approximating the width of said groove mounted about said body of yieldable material and having at one end thereof a flange extending into said groove between said body of yieldable material and one side wall of said groove, said attaching member having an internal diameter less than the initial external diameter of said body of yieldable material, whereby said body of yieldable material is retained in tight sealing engagement with the other side wall and the bottom wall of said groove.

8. A cover for a universal joint of the type comprising a coupling member having an exterior circumferential groove, said cover comprising a flexible tubular member one end portion of which extends about said groove and an annular sealing member of yieldable material mounted in said groove within and in engagement with said end portion of said cover, an annular metallic attaching member mounted about said end portion of said cover and having an internal diameter less than the initial external diameter of said sealing member, whereby said sealing member is retained in said groove in tight sealing engagement with the wall of said groove and said end portion of said cover is gripped firmly between said sealing member and said attaching member.

GEORGE B. STILLWAGON, Jr.

REFERENCES CITED

The following references are of record in the file of this patent:

UNITED STATES PATENTS

| Number | Name | Date |
|---|---|---|
| 901,339 | Grant | Oct. 20, 1908 |
| 1,352,019 | Murphy | Sept. 7, 1920 |
| 1,397,413 | Evans | Nov. 15, 1921 |
| 1,800,578 | Webb | Apr. 14, 1931 |
| 1,923,124 | Stanley | Aug. 22, 1933 |